(No Model.) 6 Sheets—Sheet 1.
J. TICKLE & F. LEONARDT.
FOLDING AND CREASING MACHINE.
No. 341,361. Patented May 4, 1886.
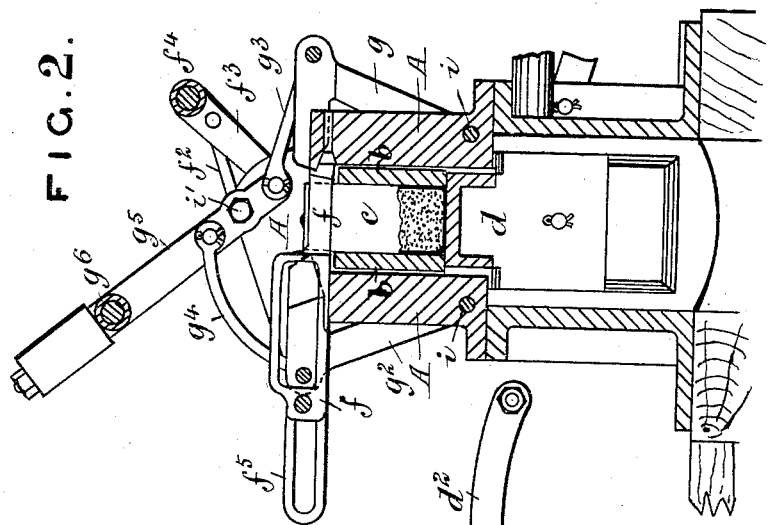
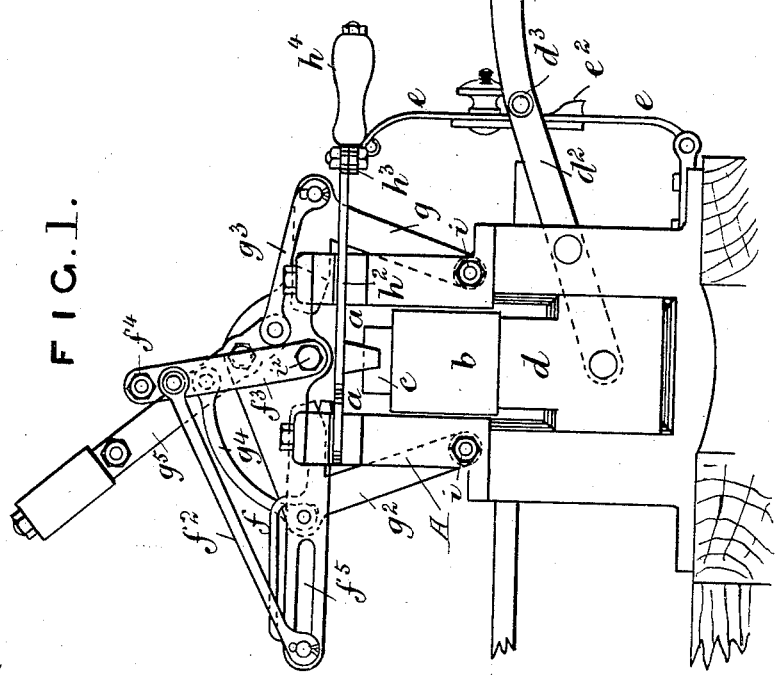
Witnesses,
George Shaw
Richard Skerrett
Inventors
John Tickle
Frederick Leonardt (No Model.) 6 Sheets—Sheet 2.
J. TICKLE & F. LEONARDT.
FOLDING AND CREASING MACHINE.
No. 341,361. Patented May 4, 1886.
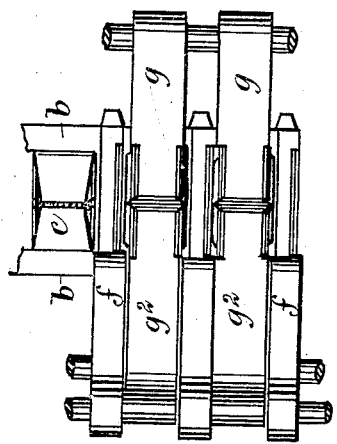
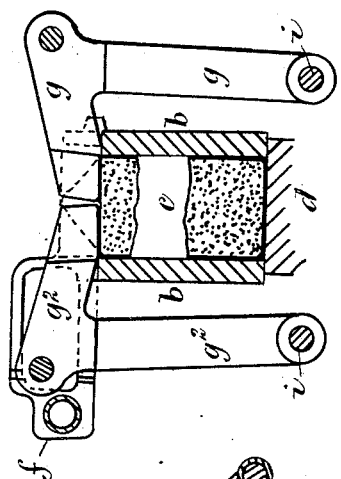
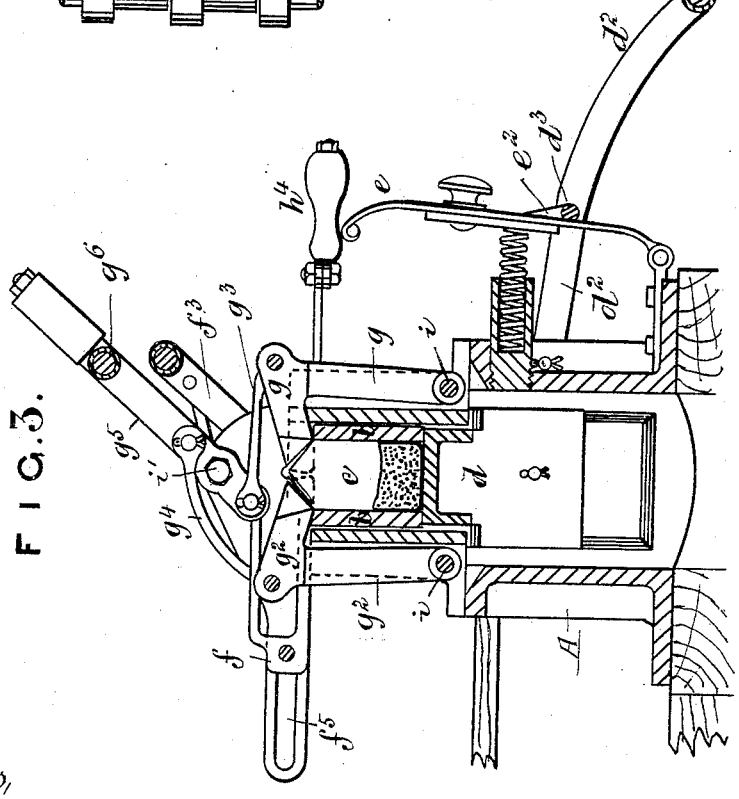
Witnesses,
George Shaw
Richard Skerrett
Inventors
John Tickle
Frederick Leonardt

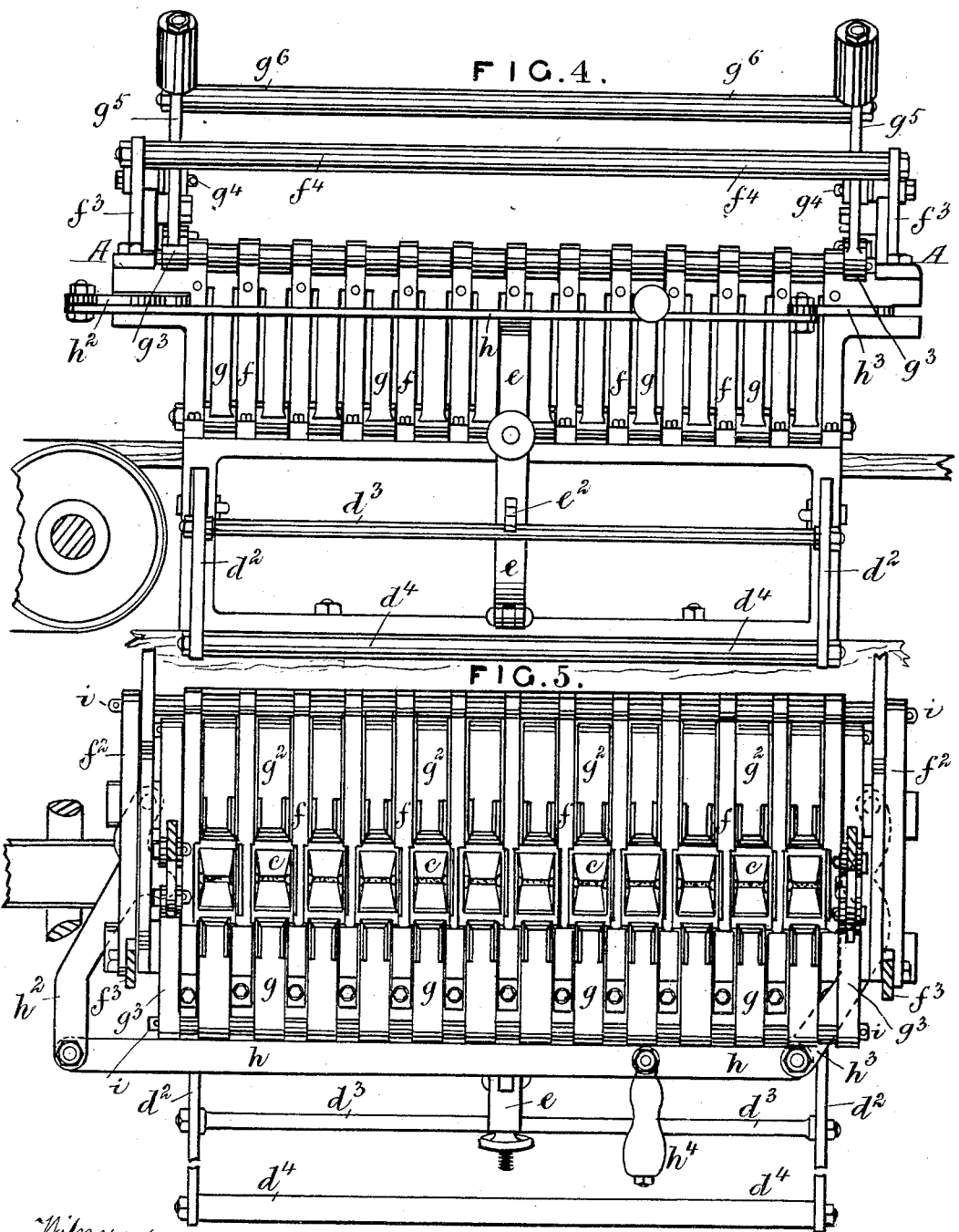

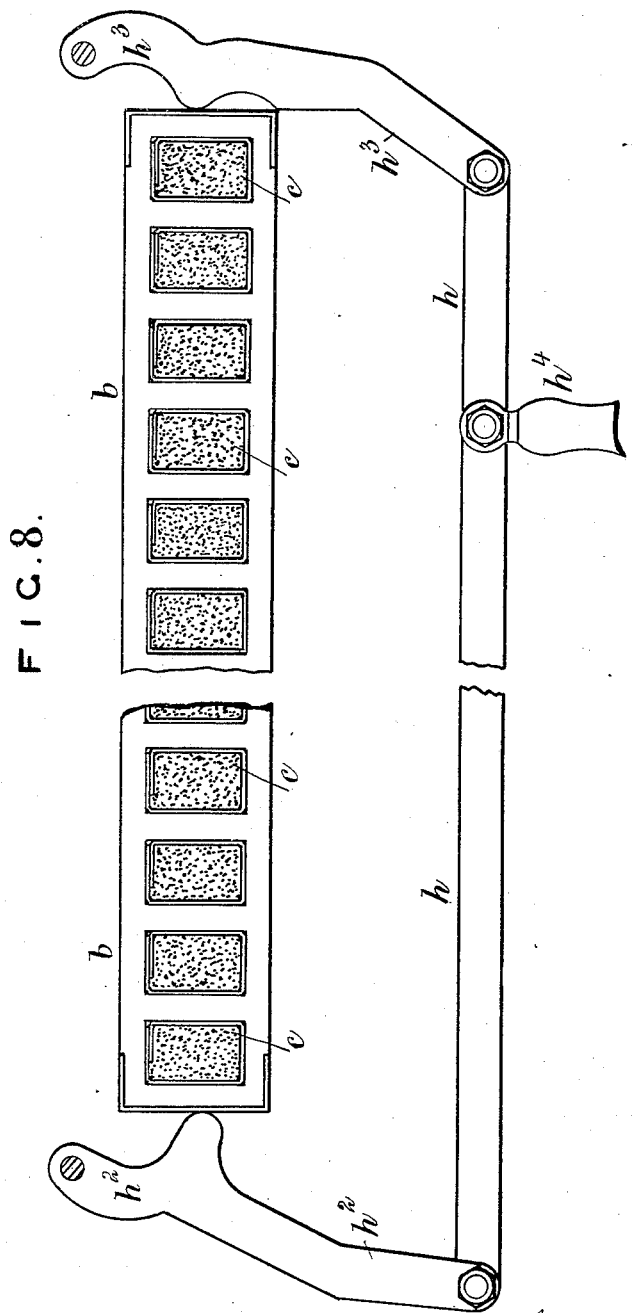

(No Model.) 6 Sheets—Sheet 5.

J. TICKLE & F. LEONARDT.
FOLDING AND CREASING MACHINE.

No. 341,361. Patented May 4, 1886.

Witnesses,
George Shaw
Richard Skerrett

Inventors
John Tickle
Frederick Leonardt (No Model.) 6 Sheets—Sheet 6.
J. TICKLE & F. LEONARDT.
FOLDING AND CREASING MACHINE.
No. 341,361. Patented May 4, 1886.
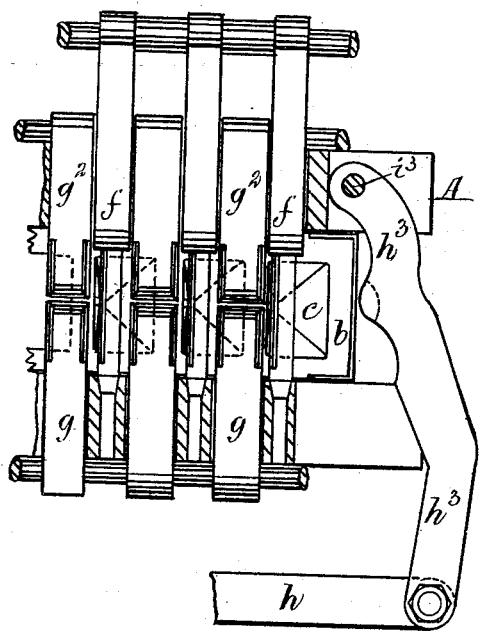
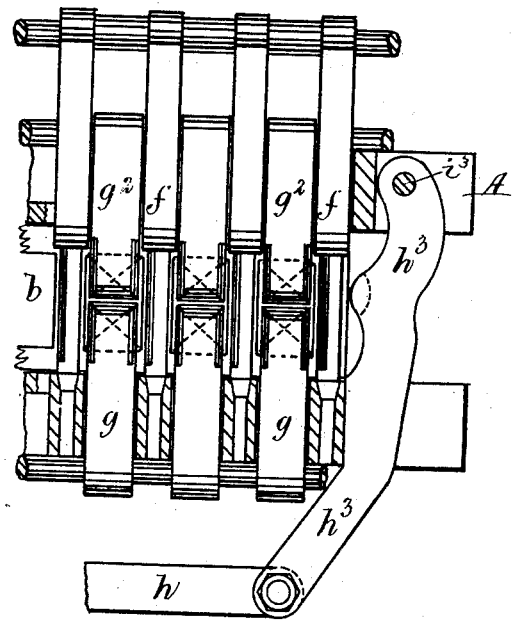
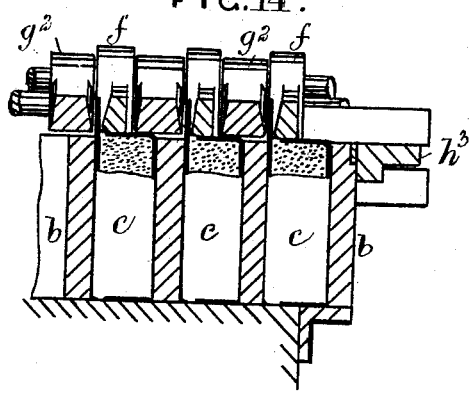
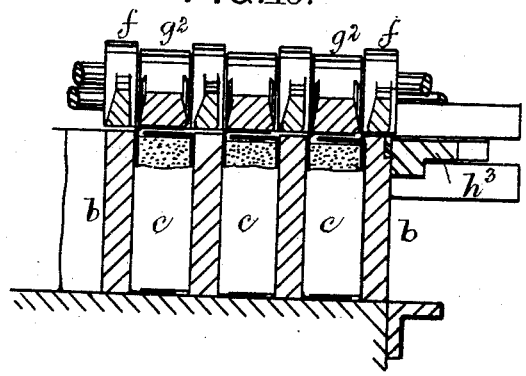
Witnesses,
George Shaw
Richard Skerrett
Inventors
John Tickle
Frederick Leonardt

UNITED STATES PATENT OFFICE.

JOHN TICKLE, OF WEST BROMWICH, AND FREDERICK LEONARDT, OF HANDSWORTH, COUNTY OF STAFFORD, ASSIGNORS TO EDWARD CADDICK, OF WEST BROMWICH, WILLIAM CREED, OF STROUD, AND ARNOLD THOMAS, OF NEWNHAM, ENGLAND.

FOLDING AND CREASING MACHINE.

SPECIFICATION forming part of Letters Patent No. 341,361, dated May 4, 1886.

Application filed February 17, 1885. Serial No. 156,192. (No model.) Patented in England May 15, 1884, No. 7,743; in France January 22, 1885, No. 166,593; in Belgium January 22, 1885, No. 67,655, and in Germany February 8, 1885, No. 33,463.

*To all whom it may concern:*

Be it known that we, JOHN TICKLE, of West Bromwich, in the county of Stafford, England, mechanical engineer and iron-founder, and FREDERICK LEONARDT, of Handsworth, in the county of Stafford, England, merchant, subjects of the Queen of Great Britain, have invented new or improved folding or creasing machinery and ejecting apparatus, to be used in making up packets of powdered materials and other commodities for sale, (for which we have made application for Letters Patent in Great Britain on the 15th day of May, 1884, No. 7,743; in France on the 22d day of January, 1885, No. 166,593; in Belgium on the 22d day of January, 1885, No. 67,655, and in Germany on the 8th February, 1885, No. 33,463,) of which the following is a specification.

Our invention consists of the construction and combination of the parts hereinafter described, and illustrated in the accompanying drawings, of hand-worked machinery for folding, closing, or creasing the open ends of a series of filled bag-like cases or wrappers contained in a divided "mold" or box, and also of apparatus for ejecting the filled and closed packets from the divided mold or box.

Figure 9:
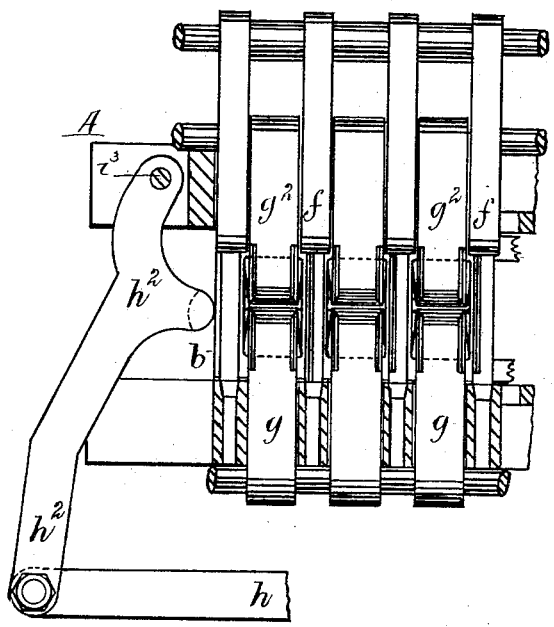
Figure 11:
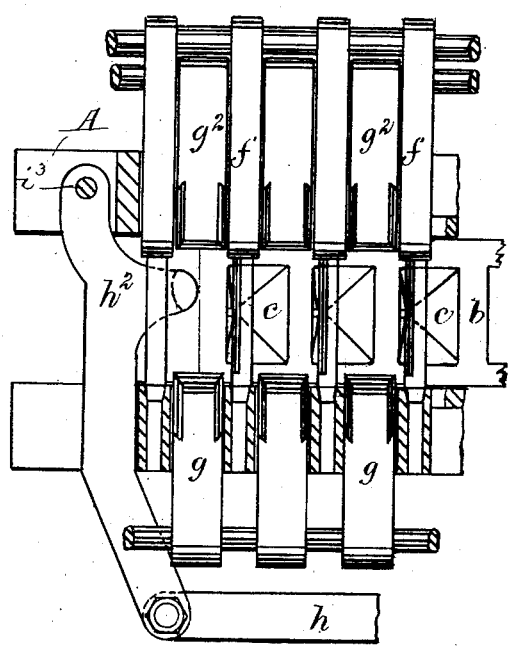
Figure 10:
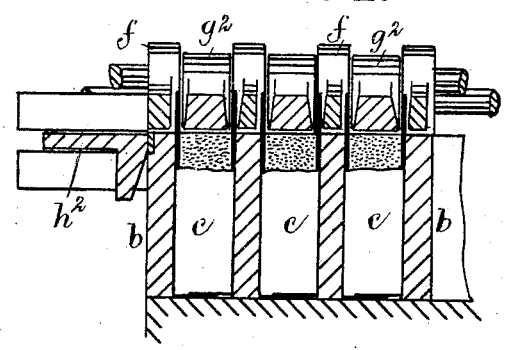
Figure 12:
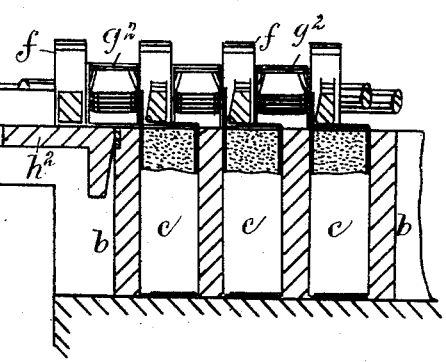

Figure 1 of the accompanying drawings represents an end elevation of the creasing or folding machine, with the divided mold containing the filled bags or cases in the channel or race on the top of a rising platform, the creasers and dividing-bars being represented in their withdrawn or non-acting positions. Fig. 2 represents a transverse vertical section of the machine, with the rising platform raised into position and the dividing-bars drawn forward into their acting positions between the open ends of the several packets. Fig. 3 represents the same view as Fig. 2, with the back and front creasers brought into their acting positions for effecting the first two creases or folds of the several packets. Fig. 4 represents a side elevation of the parts as in Fig. 3, and Fig. 5 represents a plan, with the back and front creasers returned to their non-acting position after having effected the first two creases or folds. Fig. 6 represents a portion of the devices in Fig. 3, drawn to a larger scale. Fig. 7 represents a plan of the same. Fig. 8 represents a plan of the mold or box, drawn to a larger scale, exhibiting the lever arrangement by which the said mold is moved laterally in opposite directions for making the third and fourth creases or folds. Fig. 9 represents in plan a portion of the machine drawn to a larger scale, showing the dividing-bars in their acting position, the back and front creasers having made the first two creases or folds. Fig. 10 represents a vertical section of the parts in the position shown in Fig. 9. Fig. 11 represents in plan a portion of the machine drawn to a larger scale, showing the dividing-bars in their acting position, the back and front creasers returned to their non-acting position, the mold or box having been moved laterally to the right, and the right-hand flaps or folds of the several packets drawn underneath the dividing-bars for making the third creases or folds. Fig. 12 represents a vertical section of the parts in the position shown in Fig. 11. Fig. 13 represents a plan drawn to a larger scale, showing the dividing-bars in the same position as in Fig. 11, with the back and front creasers again brought into their acting position, ready to effect the fourth creases or folds. Fig. 14 represents a vertical section of the parts in the position shown in Fig. 13. Fig. 15 represents a plan, and Fig. 16 a section, of the same drawn to a larger scale, showing the dividing-bars and the back and front creasers in their acting positions, the mold or box having been moved laterally to the left and the left-hand flaps drawn underneath the back and front creasers, thus effecting the fourth creases and completing the creasing or folding of the tops of the several packets.

The same letters of reference indicate the same parts in Figs. 1 to 16, both inclusive.

In the said drawings, A designates the frame which supports the operative parts of the machine.

After the bags have been filled the mold $b$, containing them, is passed from the filling-machine into the channel or race $a$, Fig. 1, onto the top of the rising platform $d$, when in its lowered position. The platform $d$ is then raised by means of the levers $d^2$ to the required height, as represented in Figs. 2 and 3, thus lifting the mold $b$ into position between the side horizontal levers, $h^2\ h^3$. (Best seen in Figs. 1 and 8.) The platform $d$ is held in its raised position by means of the spring-lever catch $e$, carrying the sliding-adjustable tooth $e^i$. When the levers $d^2$ are pressed down by the handle $d^i$, the distance rod or pin $d^3$ between them first presses back the spring-lever catch $e$ by acting upon the inclined tooth $e^2$, and afterward engages under the said tooth in the manner shown in Fig. 3. After the mold $b$ has been raised between the levers $h^2\ h^3$ the dividing-bars $f$, which also act as side creasers, are moved by a sliding motion into their acting position between the open ends of the several bags or cases $c$ by pressing upon the handle $f^i$. The several dividing-bars $f$ are connected to a rod, and on the ends of this rod are links $f^2\ f^2$, which are connected to the levers $f^3\ f^3$, pivoted at $i^2$ to the fixed framing of the machine. The two levers $f^3\ f^3$ are connected together by the cross rod or handle $f^i$.

It will be seen by an examination of Figs. 1, 2, 3, 4, and 5 that the ends of the rod carrying the several dividing-bars $f$ work in the slotted plates $f^5$ on the frame of the machine, the sliding motion of the said dividing-bars being limited by the slots in the said plates.

By means of the handle $f^i$ and the levers and links represented the several dividing-bars are simultaneously advanced between the open mouth of the several filled bags or packets $c$, or withdrawn from between them. Having in this way advanced the dividing-bars $f$, the several front creasers, $g$, and back creasers, $g^2$, which consist of levers turning on the centers $i\ i$, are next brought simultaneously against the open ends of the bags or cases $c$ by the action of the levers $g^5\ g^5$ and links $g^3\ g^4$, the said levers being connected together by the handle $g^6$, and pivoted to the frame A at $i'$. The first two creases or folds on opposite sides of the several bags are thus effected. The front and back creasers, $g\ g^2$, are now returned to their non-acting position, Figs. 1, 2, 5, 11, and 12. The mold $b$ is next moved in a lateral direction to the right hand by means of the end lever, $h^2$, of the two levers $h^2\ h^3$, the said levers being coupled together by the rod $h$ and worked by the handle $h^i$, and are pivoted to the frame A at $i^3$. (See Figs. 9, 11, 13, 15.) As the mold $b$ is moved as described the right hand flaps of the several bags in the said mold are drawn underneath the dividing-bars $f$, which now act as side creasers, thus making the third crease or fold of each of the several bags. The front creasers, $g$, and back creasers, $g^2$, are again advanced into their acting position, the said creasers passing over the third creases or folds last made, as represented in Figs. 13 and 14, and the mold $b$ is then moved to the left hand by the movement of the end lever, $h^3$, operated by the handle $h^4$, as seen in Figs. 15 and 16. The left-hand flaps are thereby drawn underneath the front and back creasers, $g\ g^2$, which now act as side creasers, thus effecting the fourth crease or fold in each of the bags or cases. The levers $d^2$ being next pressed down by their handle $d^4$ beyond the position represented in Fig. 3, the platform $d$ is raised, and the ends of the now folded packets $c$ are forced against the front and back creasers $g\ g^2$, thereby squaring the ends and perfecting the figure of the packets. The front and back creasers, $g\ g^2$, and the dividing-bars $f$ being returned to their non-acting positions, the distance-rod $d^3$ of the levers $d^2$ being released from the tooth $e^2$ of the spring-catch $e$, the platform $d$ descends to its first position, as represented in Fig. 1. The several bags or cases in the mould $b$ are in this way simultaneously creased and the figure of the closed packets perfected. The mold $b$ containing the packets is now passed to another part of the machine for ejecting the packets from the mold and conducting the ejected packets from the machine for rewrapping. This part of our invention will not be described here, as it will form the subject of a separate application.

Although our invention is principally applicable to the making up for sale of packets of powdered materials, yet it may also be applied to the making up for sale of packets of other commodities—such as tea, seeds, and the like.

Having now particularly described and ascertained the nature of our said invention and in what manner the same is to be performed, we declare that what we claim is—

1. The combination, with a mold carrying a series of pockets and a platform for supporting the same, of a series of sliding dividing-bars, $f$, to pass between said pockets, the levers $f^3$, the connected cross-rod $f^4$, and the links $f^2$, connecting levers $f^3$, and sliding bars $f$, substantially as described.

2. The combination, with a mold carrying a series of pockets and a platform for supporting the same, of the levers $f^3$, the cross-rod $f^4$, the slotted plates $f^5$, fixed to or forming part of the framing, the sliding dividing-bars $f$, to pass between said pockets, a rod connecting said dividing-bars and moving in the slots of plate $f^5$, and the links $f^2$, connecting the bars $f$ and levers $f^3$, substantially as described.

3. The combination, with a mold carrying a series of pockets and a platform for supporting the same, of the lever-creasers $g\ g^2$, pivoted at $i$ to the frame of the machine, the connected levers $g^5$, pivoted to the frame at $i'$, and the links $g^3\ g^4$, connecting said creasers and levers, $g^5$, substantially as described.

4. The combination, with a reciprocating mold carrying a series of pockets and a platform for supporting the same, of the levers $h^2$ $h^3$, pivoted to the frame and bearing against the ends of the mold, the rod $h$, connecting the free ends of levers $h^2$ $h^3$, and a lever or handle for imparting motion to said levers, substantially as described.

5. The combination of the mold carrying the pockets, the front and back creasers, $g$ $g^2$, the sliding platform carrying the mold, and a lever to raise the platform to bring the pockets against said creasers, substantially as described.

6. The combination of the vertically-sliding platform, the levers $d^2$, for operating the same, and a spring-lever-catch to engage with said levers to lock the platform in its elevated position, substantially as described.

7. The combination of the vertically-moving platform, the levers $d^2$, for operating the same, provided with a distance rod or pin, $d^3$, and a spring-lever catch, $e$, provided with an adjustable tooth, $e^2$, for the distance-pin of the elevating-levers to engage with, substantially as described.

JOHN TICKLE. [L. S.]
FREDERICK LEONARDT. [L. S.]

Witnesses:
GEORGE SHAW,
RICHARD SKERRETT.